(12) United States Patent
Nghiem et al.

(10) Patent No.: US 9,698,847 B2
(45) Date of Patent: Jul. 4, 2017

(54) WIRELESS COMMUNICATION DEVICE GRIP GUIDE

(71) Applicant: Global Wireless Technology Inc., Shoreview, MN (US)

(72) Inventors: Arthur Jason Nghiem, Shoreview, MN (US); David Nghiem, Shoreview, MN (US)

(73) Assignee: Global Wireless Technology Inc., Shoreview, MN (US)

( * ) Notice: Subject to any disclaimer, the term of this patent is extended or adjusted under 35 U.S.C. 154(b) by 143 days.

(21) Appl. No.: 14/921,282

(22) Filed: Oct. 23, 2015

(65) Prior Publication Data

US 2017/0117929 A1    Apr. 27, 2017

(51) Int. Cl.
*H04M 1/00* (2006.01)
*H04B 1/3827* (2015.01)
*H04M 1/02* (2006.01)

(52) U.S. Cl.
CPC ........ *H04B 1/3838* (2013.01); *H04M 1/0281* (2013.01)

(58) Field of Classification Search
CPC .. H04B 1/3838; H04B 7/0413; H04B 5/0031; H04B 5/0037; H04B 5/02; H04M 1/0281
USPC ......... 455/575.8, 575.4, 575.3, 575.1, 550.1, 455/90.3; 379/428.01
See application file for complete search history.

(56) References Cited

U.S. PATENT DOCUMENTS

| | | | |
|---|---|---|---|
| 8,214,003 B2 | 7/2012 | Wong et al. | |
| D674,380 S | 1/2013 | Soekoro | |
| 2004/0253972 A1* | 12/2004 | Iwai | H01Q 1/12 455/550.1 |
| 2013/0249358 A1 | 9/2013 | Stevenson | |
| 2015/0103018 A1* | 4/2015 | Kamin-Lyndgaard | G09G 5/006 345/173 |

OTHER PUBLICATIONS

"Apple iPhone 5 iPhone 5S 3D Bear Silicone Soft Case Cover (Brown)", http://www.amazon.com/Apple-iPhone-Silicone-Cover-Brown/dp/B00FWWBVTA, 1 pg.
"Radiation Issue", [Online]. Retrieved from the Internet: <URL: http://www.GlobalEnvironmentCenter.com, (Oct. 25, 2010), 3 pgs.
"SAR For Cell Phones: What It Means For You", Federal Communications Commission, [Online]. Retrieved from the Internet: <URL: www.fcc.gov/consumer-governmental-affairs-bureau, (Mar. 12, 2014), 2 pgs.

(Continued)

*Primary Examiner* — Shaima Q Aminzay
(74) *Attorney, Agent, or Firm* — Schwegman Lundberg & Woessner, P.A.

(57) ABSTRACT

A grip guide for a hand held wireless communication device housing that guides proper hand placement on the housing. The grip guide can include a frame having an interior region sized and shaped to receive a hand held wireless communication device. An exterior surface includes first and second protrusions adjacent an antenna area of the communication device, and a gripping region between the regions. The protrusions guide a user to grip the housing at the gripping regions.

5 Claims, 8 Drawing Sheets

(56) References Cited

OTHER PUBLICATIONS

Gandhi, Om P., "Underestimation of EMF/NIR Exposure for Children for Mobile Telephones and for Electronic Article Survellance(EAS) Systems", International NIR and Health Workshop, (May 2009), 39 pgs.

Li, C., et al., "Analysis of the Hand E ect on Head SAR with Generic and CAD Phone Models Using FDTD", (2010), 4 pgs.

Means, David L., et al., "Evaluating Compliance with FCC Guidelines for Human Exposure to Radiofrequency Electromagnetic Fields", Federal Communications Commission Office of Engineering & Technology Supplement C (Edition 01-01), (Jun. 2001), 57 pgs.

\* cited by examiner

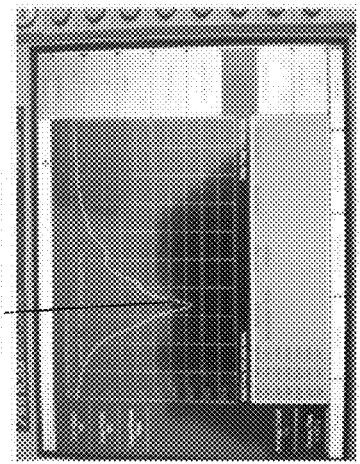
FIG. 1A
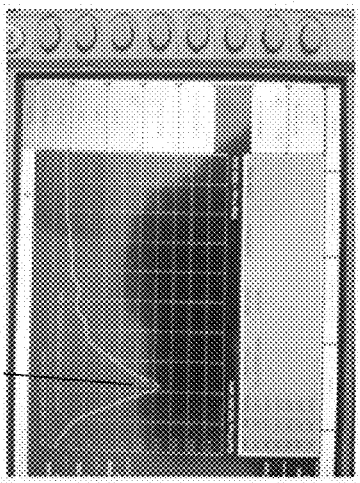
FIG. 1C
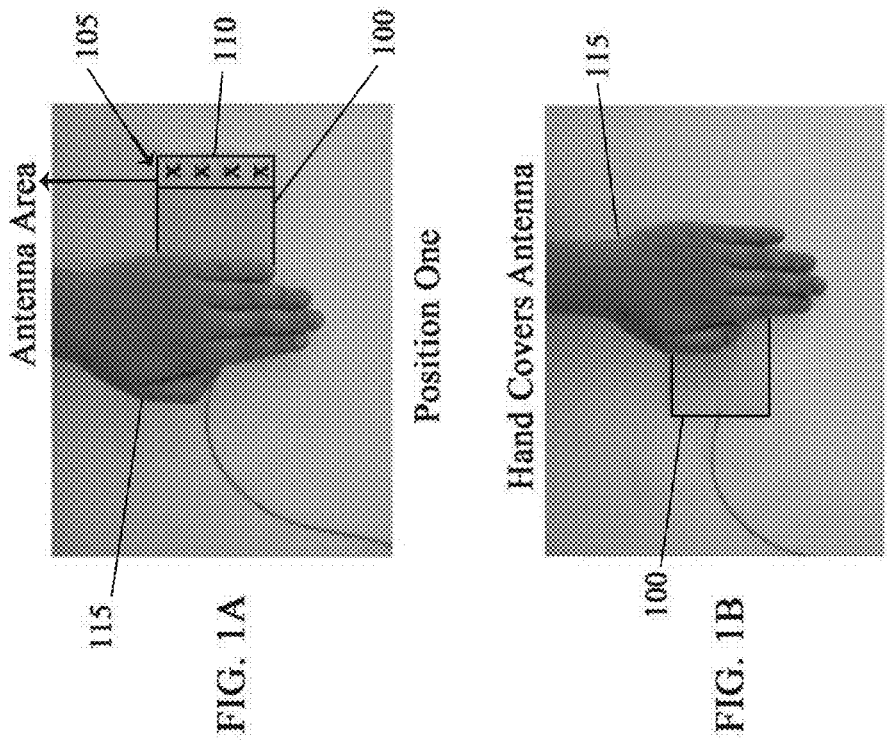

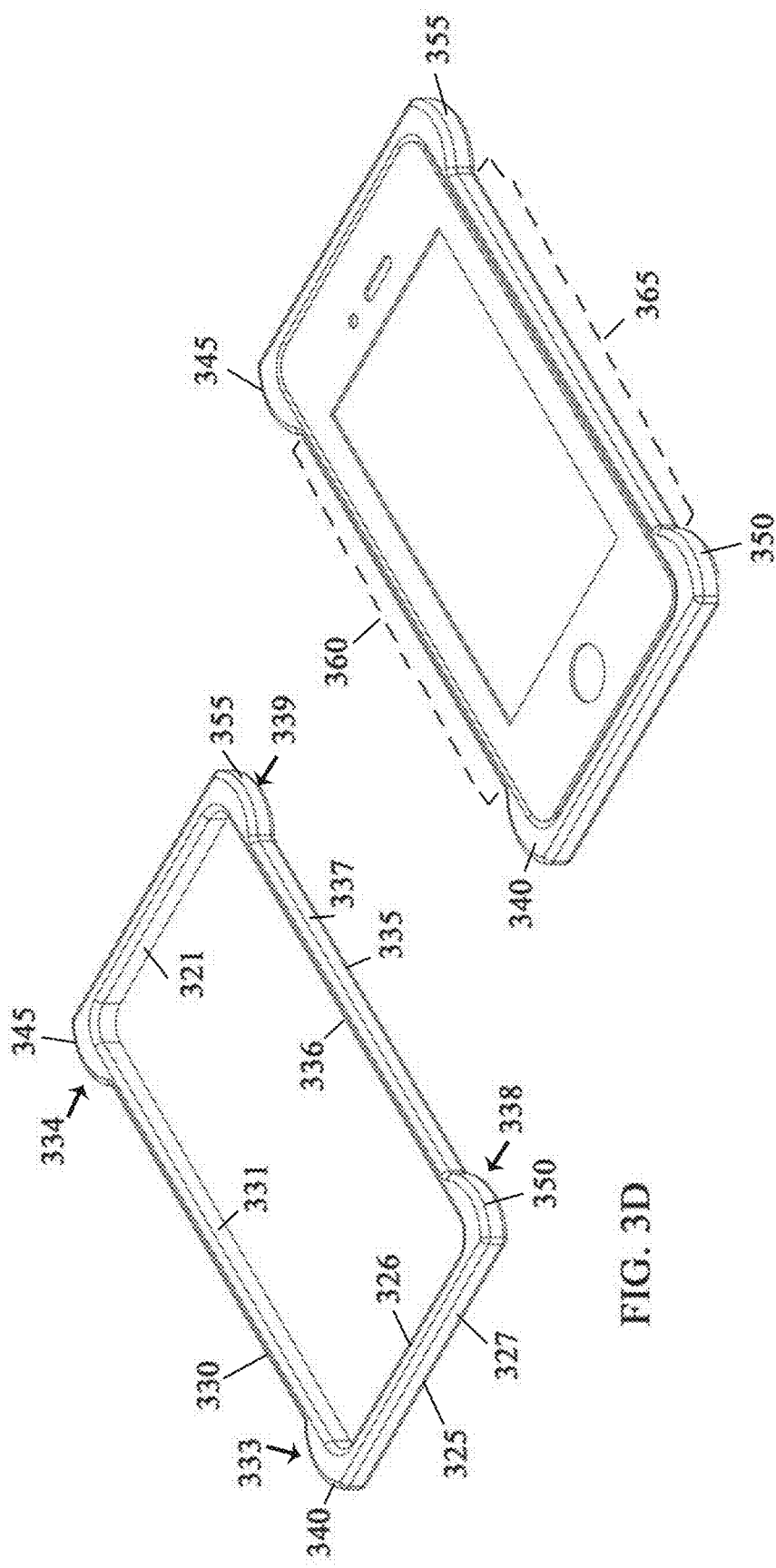

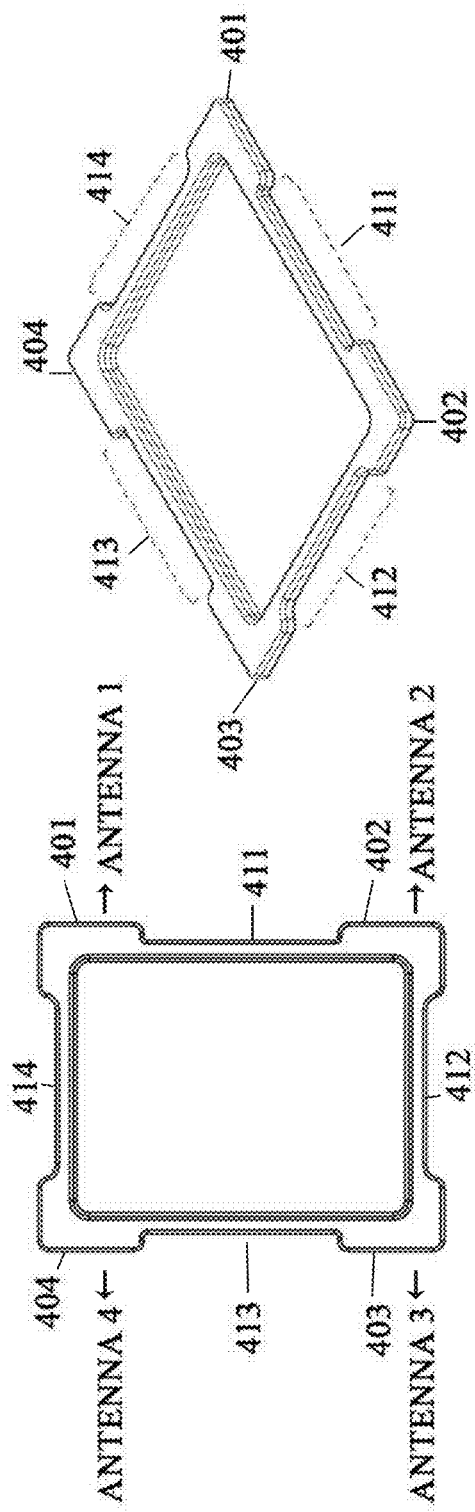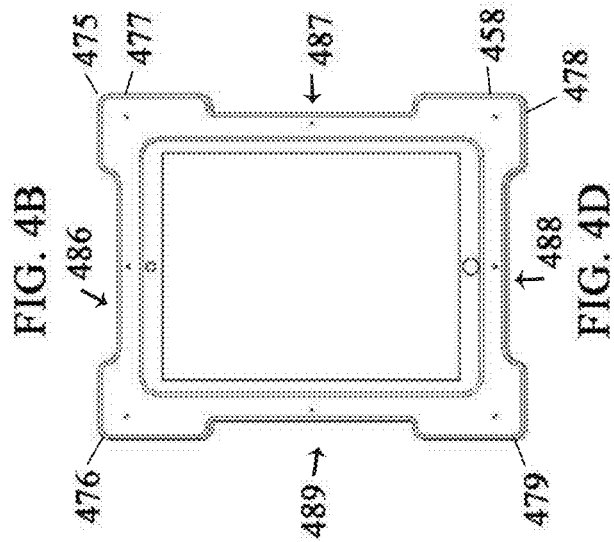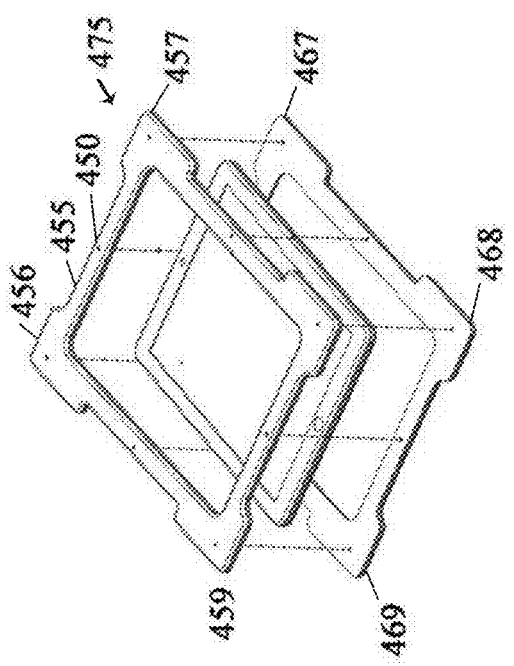

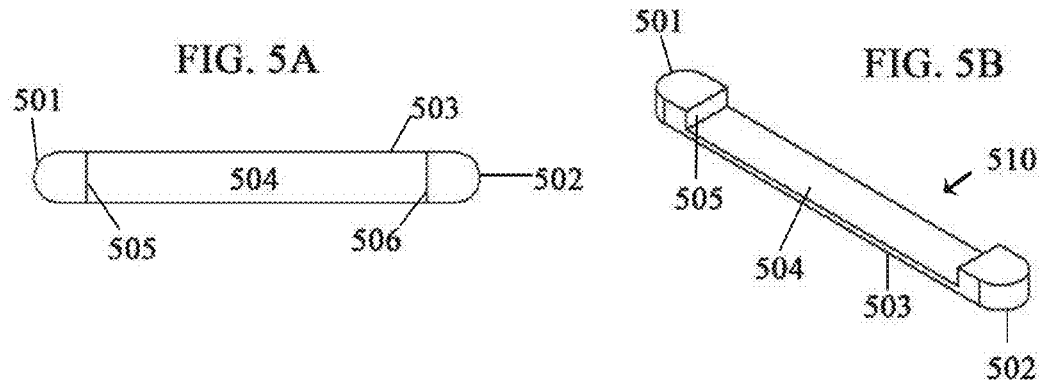
FIG. 5A
FIG. 5B
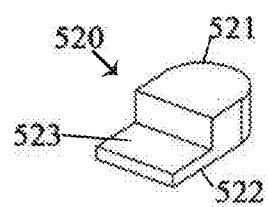
FIG. 5D
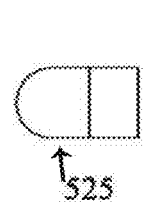
FIG. 5C
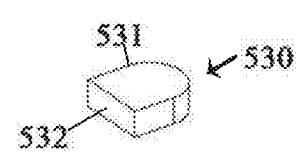
FIG. 5E
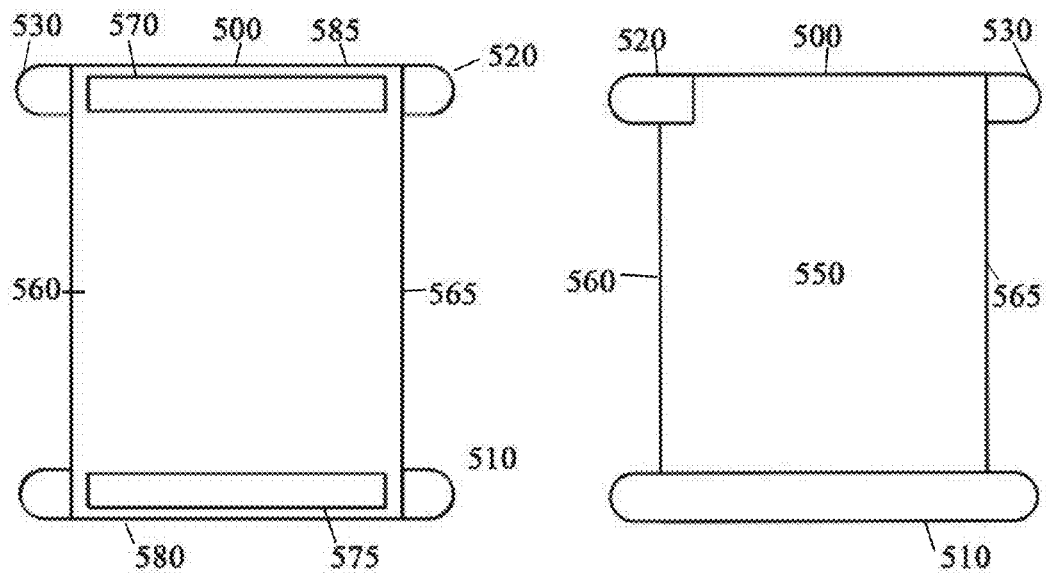
FIG. 5F
FIG. 5G

WIRELESS COMMUNICATION DEVICE GRIP GUIDE

BACKGROUND

Communication devices such as cell phones and tablets include one or more antennas for communication. A cell phone typically includes an antenna for communicating with a cellular network, such as a 3G GSM or CDMA, or 4G LTE network. A cell phone may also include a Wi-Fi antenna and a Bluetooth antenna.

Wireless communication performance is affected by a number of factors, including signal strength, interference, network bandwidth, and antenna design. The proximity of an antenna to objects that absorb electromagnetic energy can impact the performance of an antenna.

The current United States Federal Communications Commission (FCC) specific absorption rate (SAR) test set-up for cell phones uses standardized models of the human head and torso. (See SAR For Cell Phones: What it Means For You.)

U.S. Pat. No. 8,214,003, entitled "RF radiation redirection away from portable communication device user" is directed to a case for a wireless device that includes a number of RF coupling elements mounted in the case and configured such that RF radiation is coupled from an internal antenna of the wireless device out of the device to a first RF coupling element, and from the first RF coupling element to a RF redirector coupling element that redirects the RF radiation in a direction outward from said wireless device that is opposite to a user side of the wireless device.

U.S. design Pat. No. D674,380 is directed to an ornamental design for a cell phone.

United States patent publication number US20130249358 is directed to a protective cover for a portable mobile device including a top portion having a three-dimensional design; and a bottom portion having a three-dimensional design, wherein the top and bottom portions are operably separable from each other.

OVERVIEW

The present inventors have recognized, among other things, that a problem to be solved can include antenna loss and absorption of radiation into the hand of a user due to holding of a communication device with an antenna region situated near the hand of the user. A. The present subject matter can help provide a solution to this problem, such as by structuring an antenna housing to guide a user to hold a communication device at the antenna region positioned away from the user's hand.

An example hand held wireless communication device housing guides proper hand placement on the housing. An exterior surface of the housing can include one or more protrusions adjacent to one or more antenna areas of the communication device. The housing can include a gripping region between the regions. The protrusions can guide a user to grip the housing at the gripping regions.

In an example, the housing can be a removable or permanent case. Additionally or alternatively, the housing or can be part of the wireless communication device.

This overview is intended to provide an overview of subject matter of the present patent application. It is not intended to provide an exclusive or exhaustive explanation of the invention. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

FIG. 1A is an illustration of a device with an antenna and a hand placed near the antenna.

FIG. 1B is an illustration of the device of FIG. 1A, with the hand placed over the antenna.

FIG. 1C is an illustration of a test results from testing conducted with the arrangement shown in FIG. 1A.

FIG. 1D is an illustration of test results from testing conducted with the arrangement shown in FIG. 1B.

FIG. 3D is a perspective view of an example housing for a wireless communication device.

FIG. 3E is a perspective view of an example housing for a wireless communication device and a wireless communication device in the housing.

FIG. 4A is a top view of an example housing for a wireless communication device.

FIG. 4B is a perspective view of an example housing for a wireless communication device.

FIG. 4C is a perspective assembly view of a front portion and back portion of an example housing and a wireless communication device.

FIG. 4D is a top view of an example housing for a wireless communication device and a wireless communication device assembled into the housing.

FIG. 5A is a top view of an example grip guide having first and second protrusions and a back portion connection the protrusions.

FIG. 5B is a perspective view of an example grip guide having first and second protrusions and a back portion connecting the protrusions.

FIG. 5C is a top view of example grip guides having tabs.

FIG. 5D is a perspective view of an example grip guide having tabs.

FIG. 5E is a perspective view of an example grip guide.

FIG. 5F is a front view of a handheld wireless communication device housing with connected grip guide protrusions.

FIG. 5G is a back view of a handheld wireless communication device housing with connected grip guide protrusions.

DETAILED DESCRIPTION

Figure 3A:
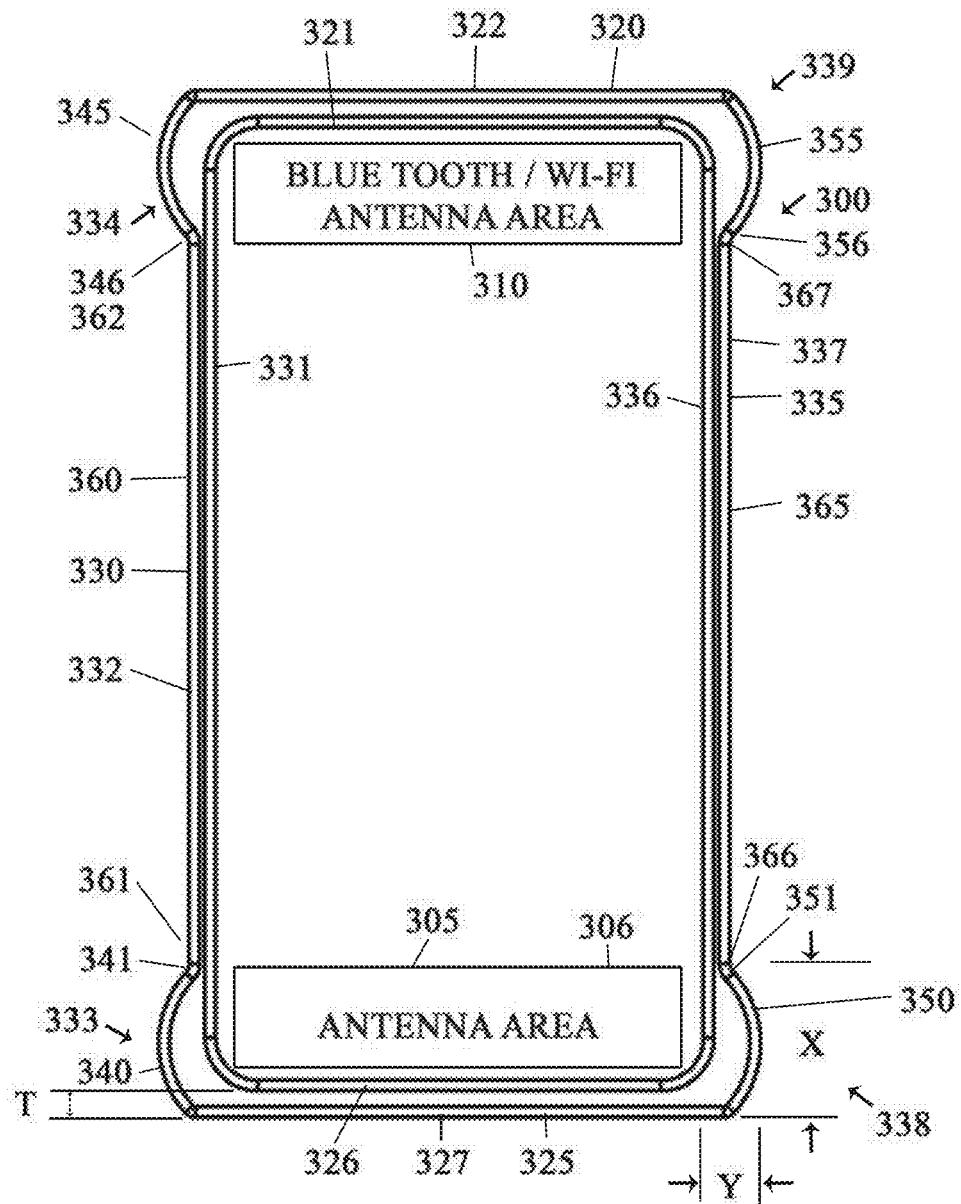
FIG. 3A is an illustration of an example housing for a wireless communication device.
Figure 3C:
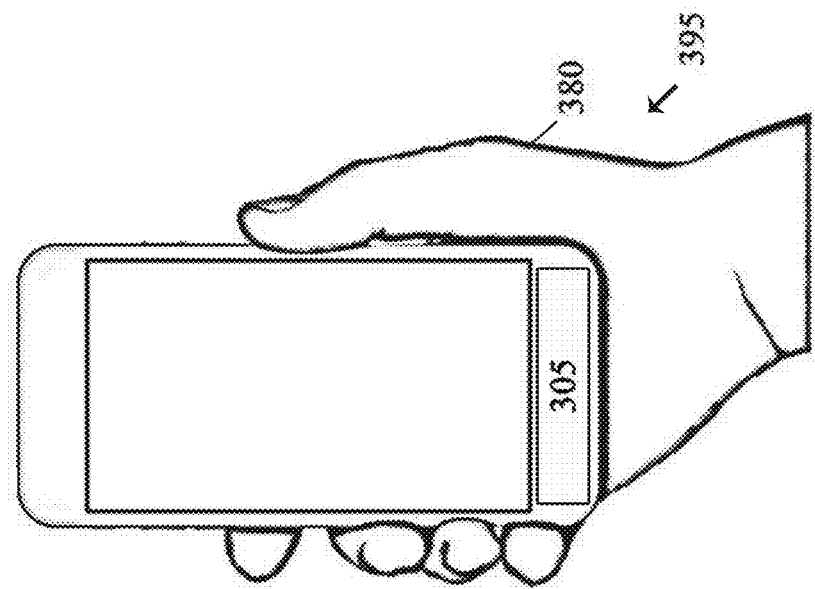
FIG. 3C is an illustration of a prior art housing for a wireless communication device and a user's hand gripping the device.
Figure 3B:
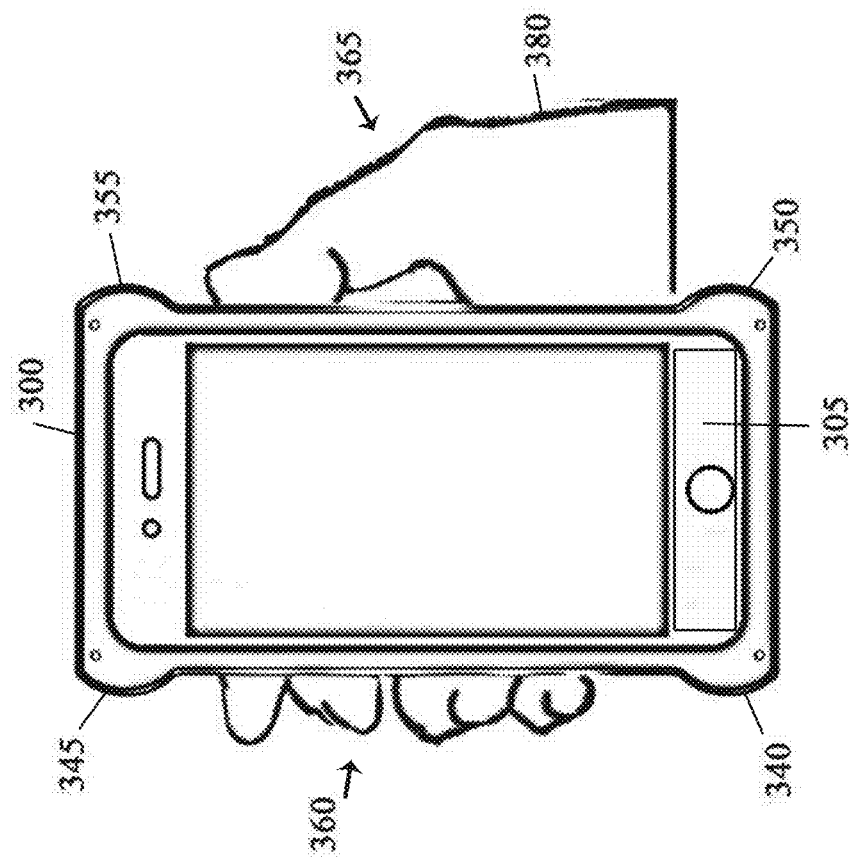
FIG. 3B is an illustration of an example housing for a wireless communication device and a user's hand gripping the device.

A housing for a handheld wireless communication device such as a cellular phone is designed to guide a user to hold the device in a manner that reduces the impact of radiation absorption into the hand of the user. Cell phone cases are typically designed with thin walls to minimize the impact of the case on the performance of the antenna. However, the presence of human tissue, such as a hand, near the antenna also adversely impacts the performance of the antenna. The inventor has recognized that placement of protrusions on the housing near the antennas, while counter-intuitively increasing the antenna losses caused by the case, also promote hand placement away from the antenna. When the device is placed in the housing and held in the hand as shown in FIG. 3B, the result is reduced radiation absorbed by the user and increased the antenna efficiency, compared to the conventional hand placement with a conventional case as shown in FIG. 3C.

The Impact of Human Tissue on Antenna Performance

Placement of an antenna near the body, e.g. in the hand or near the head, detunes the antenna: The antenna resonant frequencies are shifted up or down the frequency spectrum. Placement of an antenna near the body also absorbs radio-frequency radiation. This degrades the antenna efficiency. Inefficiency reduces performance. Many wireless devices increase antenna output when signal strength is low, which increases user exposure to radiation, and more quickly drains the battery that is driving the antenna.

The current United States Federal Communications Commission (FCC) specific absorption rate (SAR) test set-up for cell phones uses standardized models of the human head and torso. (See SAR For Cell Phones: What it Means For You.) The test set-up ignores the hand as a variable, and instead focuses on the head and torso.

The inventors have conducted testing to quantify the impact of the proximity of the antenna to a human hand. FIG. 1A shows a device 100 with an antenna positioned in an antenna region (or "antenna area", marked by four X's) on a right side 110 of the device. A hand 115 is positioned on the left side of the device, so that the hand is displace a distance (about 3 cm) from the antenna. FIG. 1B shows the same device, but with the hand positioned over the antenna. The device was tested in both configurations to quantify the influence of hand positioning. FIG. 1C and FIG. 1D present test results obtained using a network analyzer, which was used to measure return loss. In telecommunications, return loss (or "power loss") is the loss of signal power resulting from the reflection caused at an antenna feed-point where the antenna connects to the electronic circuit. It is usually expressed as a ratio in decibels. Lower return loss indicates better performance.

In the experiment, location, phone type, and the test subject were controlled. The hand location was varied. Each measurement was repeated four times.

FIG. 1C shows the results for the hand placement shown in FIG. 1A, using a center frequency of 850 MHz, which is a common 3G and 4G cellular communication frequency. The return loss was −15.63 dB and the power loss was 2.78%. FIG. 1D shows the results for the hand placement shown in FIG. 1B. The center frequency was shifted to 721.81 MHz. The return loss was −15.1 dB and the Power loss was 3.09%.

Figure 2A:
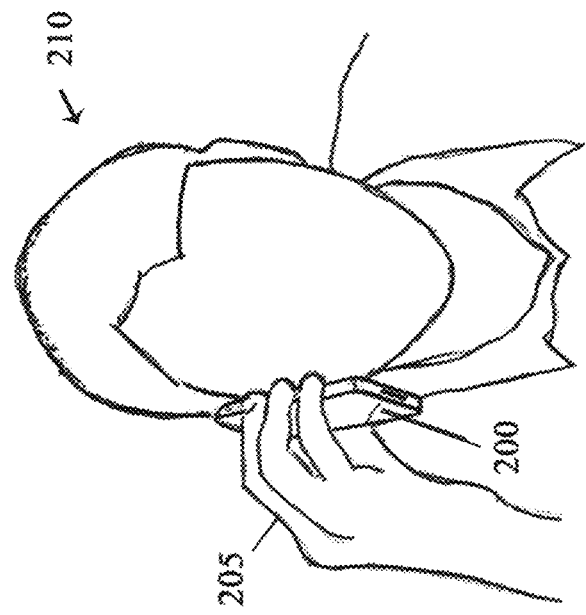
FIG. 2A is an illustration of a use scenario with a user and a cell phone cupped in the users' hand.
Figure 2B:
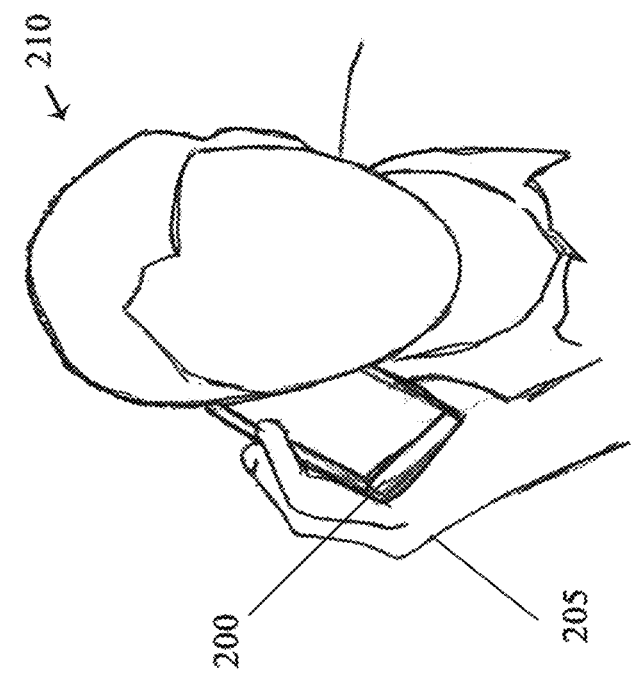
FIG. 2B is an illustration of a use scenario with a user and a cell phone spaced from the user's hand.

FIG. 2A and FIG. 2B are illustrations of two examples of cell phone placement in a typical call scenario. FIG. 2A shows a scenario with a cell phone 200 cupped into the hand 205 of a user 210. This common scenario places the hand in close proximity to the antenna (not shown, typically in the bottom of the phone as shown in FIG. 3A). FIG. 2B shows a scenario with a phone 200 held so that it is spaced from the hand 205. Greater frequency shift and antenna loss will occur in the scenario shown in FIG. 2A than the scenario shown in FIG. 2B. This data shows that a cell phone should be held away from the hand, as shown in FIG. 2B. However, most users tend to adopt the posture shown in FIG. 2A.

Example Hand Held Wireless Device Housings that Promote Proper Hand Placement

Referring now to FIG. 3A, an example hand held wireless device housing 300 is configured to promote a desired hand placement on the device. In many commercially-available cell phones, the cellular antenna is situated in the bottom of the phone, near the microphone (i.e. in the region 305 labeled "Antenna Area"), and the Bluetooth™ and Wi-Fi antenna is situated at the top of the phone (i.e. in the Bluetooth/Wi-Fi Antenna Area 310). In an example, the handheld wireless device housing 300 can be a cell phone case optimized for use with such a cellular phone.

Referring now to FIGS. 3A and 3D, the housing 300 shown in FIG. 3 can include a top wall 320 having a top wall interior surface 321 and a top wall exterior surface 322, a bottom wall 325 having a bottom wall interior surface 326 and a bottom wall exterior surface 327, a first side wall 330 having a first side wall interior surface 331 and a first side wall exterior surface 332, and a second side wall 335 having a second side wall interior surface 336 and a second side wall exterior surface 337. The top wall interior surface 321, bottom wall interior surface 326, first side wall interior surface 331, and second side wall interior surface 336 can be sized and shaped to receive a hand held device. For example, the surfaces 321, 326, 331, 336 can be interior walls of a cell phone case to hold and protect a cell phone. The housing can also include holding features such as front or back lips extending inward over a phone around at least a portion of the walls to retain the cell phone in the case.

Referring again to FIGS. 3A and 3D the outer surfaces 332, 337 of the side walls 330, 335 of the housing 300 can include one or more protrusions 340, 345, 350, 355 adjacent to the Antenna Area 305 or the Bluetooth/Wi-Fi Antenna area. For example, outer surface 332 of the first side wall 330 of the housing can include a first lower protrusion 340 at a lower portion 333 of the first side wall. The first side wall 330 can additionally or alternatively include a first second protrusion 345 at an upper portion 334 of the first side wall. The second side wall 335 can include a second lower protrusion 350 at a lower portion 338 of the second side wall 335. The second side wall can alternatively or additionally include a second upper protrusion 355 at an upper portion 339 of the second side wall 335.

The one or more protrusions can guide a user to hold the device 300 at gripping region on the side walls 330, 335 of the housing. For example, a first gripping region 360 (indicated by dotted lines in FIG. 3E) can be a region between respective first lower protrusion 340 and first upper protrusion 345 on the first side wall 330 of the housing, and a second gripping region 365 can be a region between second lower protrusion 350 and second upper protrusion 355 on the second side wall 335 of the housing. In an example, a lower end 361 of the gripping region 360 can be at the top 341 of the first lower protrusion 340, and a lower end 366 of the second gripping region 365 (indicated by dotted lines in FIG. 3E) can be at a top end 351 of the second lower protrusion 350. An upper end 362 of the gripping region 360 can be at the bottom 346 of the first upper protrusion 345, and an upper end 367 of the second gripping region 365 can be at a bottom end 356 of the second upper protrusion 350.

The protrusions can be formed so that he protrusion height (e.g. dimension X in FIG. 3A) is large enough that the gripping region does not overlap with the antenna region.

For example, the height X can be selected such that the beginning 366 of the gripping region 365 on the second side wall 335 is above the upper end 306 of the antenna area 305. In an example, the height is at least 15 mm. In an example, the width Y of the protrusion can be at least 10 mm.

In an example, the protrusions can have a curved profile, as shown in FIG. 3A. For example, the protrusions can have a circular outer edge profile. Other shapes are also possible. For example, the protrusions could be rectangular, or multi-faceted. The protrusions could also extend around to the upper or lower sides 320, 325, but the configuration shown in FIG. 3A is preferred.

In an example, the housing 300 is formed of a low dielectric constant and low loss tangent material. Low dielectric material does not change the antenna resonant frequencies significantly. This is due to the fact that the effective wavelength of the antenna is minimally increased. In an example, the case can be formed of a low loss tangent material to minimize power absorbed into the housing.

The protrusion should be firm enough to retain their shape when gripped in a hand. For example, the protrusion should not be so compressible that it can be deformed or compressed when grasped by a user. This firmness of the protrusion can guide the user to select a hand positing on the gripping region and reduce by the hand absorption of electromagnetic waves radiating from the antenna.

In an example, the walls of the housing are formed as thin as possible, i.e. the thickness of the cell-phone case material around the antenna is minimized, to minimize the effects of the housing effects on the antenna. In an example, the dimension T in FIG. 3A can be minimized, while still providing protection again impact).

Referring now to FIGS. 3B, 3C, and 3E, the handheld wireless device housing 300 can guide the user hold their cell phone in a manner that results in relatively low radiation absorption by the hand of the user. For example, by positioning the user's hand 380 in the gripping regions 360, 365, and away from the antenna region, as shown in FIG. 3B absorption of electromagnetic waves from the antenna will be lower than if the user gripped a conventional housing 390 near the lower portion 395 of the housing, as shown in FIG. 3C.

The average user will be inclined to grip away from the protrusions, because their hand fits more comfortably in the gripping region, and is thus guided by the shape of the housing to avoid a hand placement that positions tissue near the region where the antenna usually is positioned (i.e. the top and bottom ends of the device. In some examples, the protrusions can produce a housing width that is too large for average hands to wrap around, and the user is forced to grip the device in the gripping region, away from the protrusions.

Figure 3F:
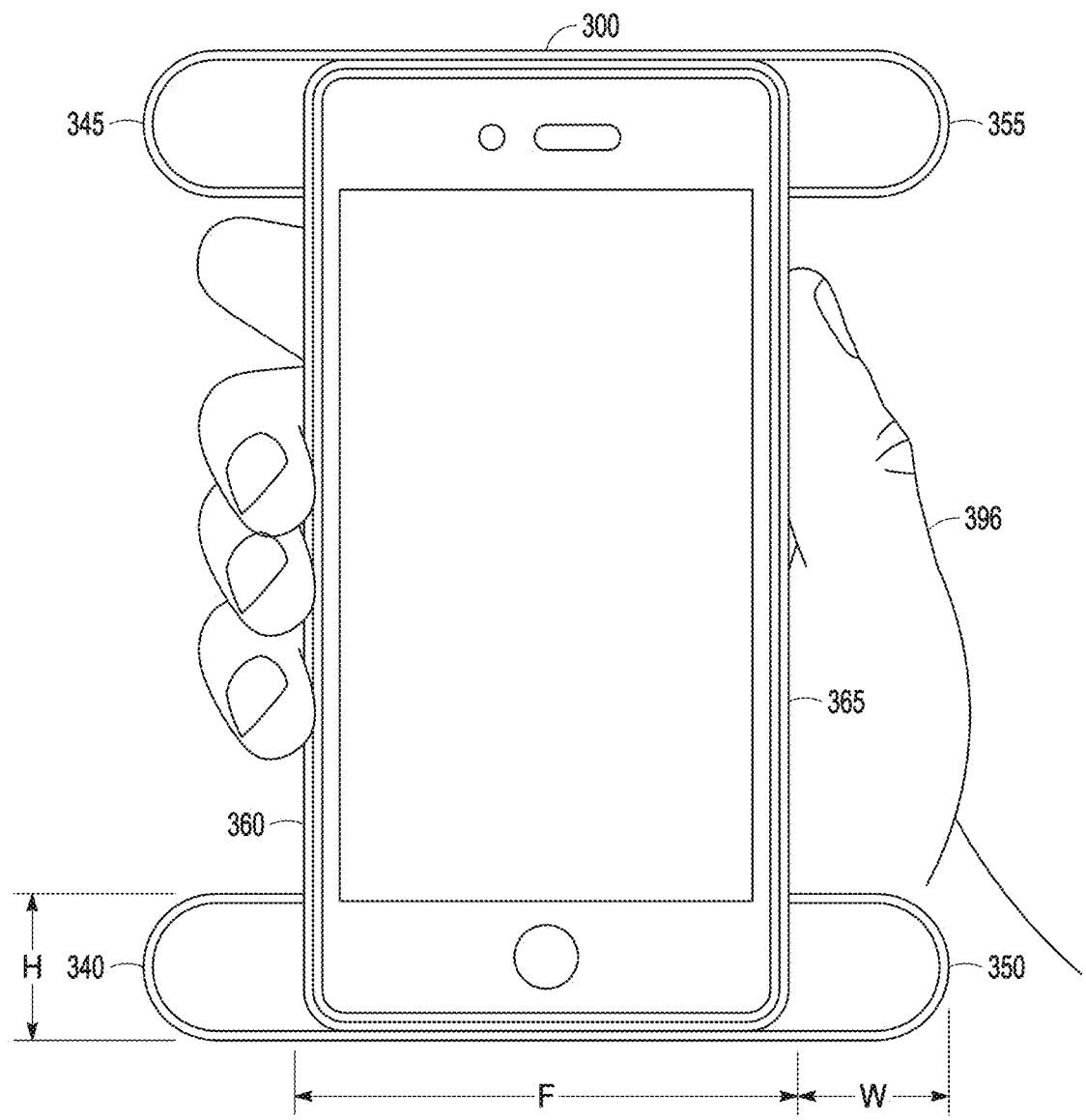
FIG. 3F is a top view of an example housing that has protrusions that force a user to grip the housing between the protrusions.

FIG. 3F shows an example of a communication device housing that has protrusions that force a user to grip the communication device 300 between the protrusions. The protrusions 340, 345, 350, 355 are wide enough that the user is forced to grip the housing in the gripping regions 360, 365, as shown by the hand 396 placement in FIG. 3F. The protrusions can have a width W that is at least ¼ the width F of the housing frame. In an example, the Width can be at least 1.4 cm. The height of the protrusion can be large enough so that the gripping region begins above the antenna region. In an example, the height H can be 15 mm.

In some examples, to have a reliable communication link for wireless medical devices, a multiple-antenna switching system (not shown) or a smart antenna system can be incorporated the handheld communication device. Smart antennas (also known as adaptive array antennas, multiple antennas) are antenna arrays with smart signal processing algorithms used to identify spatial signal signature such as the direction of arrival of the signal, and use it to calculate beam forming vectors, to track and locate the antenna beam on the mobile/target. In an example, a protrusion is provided on a housing next to each of a plurality of antennas in a multiple-antenna switching system.

Referring now to FIG. 4A, an example housing 400 can include a plurality of protrusions and gripping regions. In an example, a housing 400 is sized and shaped to receive a rectangular wireless device, such as a tablet computing device, that has four antennas—one situated near each corner of the device. The protrusions guide a user to grip the housing at one or more of the four gripping regions 411, 412, 413, 414. In an example, a rectangular housing is sized and shaped to receive a tablet computing device such as an APPLE® IPAD® or SAMSUNG® GALAXY® device.

An example housing 475 construction is shown in FIGS. 4C and 4D. A top portion 450 has a top frame 455 including top protrusion elements 456, 457, 458, 459. A bottom portion 460 has a bottom frame 465 including bottom protrusion elements 466, 467, 468, 469. A wireless communication device such as tablet can be captured between the top portion 460 and bottom portion 465, with top protrusion elements 456, 457, 458, 459, coming together with bottom protrusion elements 466, 467, 468, 469 to form protrusions 476, 477, 478, 479. Gripping regions 486, 487, 488, 489 can be defined between the protrusions. The top portion 450 and bottom portion 460 can be connected using one or more of screws, adhesive, magnets, and thermal joining processes. Other shapes and configurations are also possible. For example, variations of the housings 300, 400, 475 housing can be sized and shaped to receive other polygonal shaped devices, such as triagonal devices, pentagonal, trapezoidal, hexagonal, octagonal, or other shapes, with protrusions provided near antenna regions to guide a user to grasp away from the antenna regions.

Referring now to FIGS. 5A-5G, example grip guides 510, 520, 530 that can be attached to a housing for a handheld wireless communication device 500. For example, the grip guides can be attached directly to a cell phone or tablet, or they can be attached to a housing that is attachable to a phone or table, such as cell phone case. The grip guides can be formed of a non-metallic material to avoid affecting antenna performance. The grip guides 510, 520, 530 can be formed of foam or rubber, for example. The grip guides can be foldable, so that they can wrap around the housing, to facilitate storage in a pocket or purse. Any of the grip guides 510, 520, 530 can be attached with an adhesive, which can be a permanent adhesive, or a removable adhesive. The removable adhesive can, for example, be a pressure-sensitive adhesive. In an example, the adhesive can be supplied with the product, and exposed by removal of a cover sheet. Additionally or alternatively, the adhesive can be applied at the time the grip guide is attached to the case, e.g. by a consumer who applies adhesive and attaches the grip guide to a cell phone case.

FIGS. 5A and 5B show an example grip guide 510 that can be attached to handheld wireless communication device 500. The grip guide 510 can include a first protrusion 501 and a second protrusion 502, and a back portion 503 extending between the first protrusion 501 and second protrusion 502. An adhesive (not shown) can be applied to a top surface 504 of the back portion. The adhesive can alternatively or additionally be applied to interior faces 505, 506 of the protrusions 501, 502. The adhesive can, for example, be a permanent adhesive. The adhesive can alternatively be a removable adhesive, which can render the grip guide removable from the housing. The removable adhesive can, for example be a pressure-sensitive adhesive. As shown in FIGS. 5F and 5G, the top surface 504 of the back portion 503 can be positioned against a back surface of a housing 500 for a wireless communication device. Adhesive on the top surface 504 or one or both of the interior faces 505, 506 can be used to connect the grip guide 510 to the housing. The interior faces can be spaced to accommodate a housing for popular cell phone cases. The grip guide can be elastic enough to accommodate a range of housing sizes. For example, a grip guide can be supplied for a particular cell phone, and the grip guide can be elastic enough to accommodate a range of thicknesses for after-market cell phone cases. The grip guide can be formed of an elastic or semi-elastic foam or rubber, for example.

FIGS. 5C and 5D show a grip guide 520 that can include a protrusion 521 and a tab. An adhesive (such as a pressure-removable adhesive or permanent adhesive) can provided on a top surface 523 of the tab 522. The top surface of the tab can be positioned against a back surface of a housing for a handheld wireless communication device, as shown in FIGS. 5F and 5G. The adhesive on the top surface can connect the grip guide 520 to the housing 500. Additionally or alternatively, an inside surface 524 of the grip guide can include adhesive, which can adheres the grip guide to the housing. The grip guide 520 can be supplied with a matching grip guide 525, so that the grip guides can form a pair, with one grip guide attached to each side of a housing (not shown.) The grip guide 520 can be provided in groups of four so that they can be applied to top and bottom portions of both sides of the housing to define gripping portions on each side.

FIG. 5E shows a grip guide 530 that includes a protrusion 531 having an interior face 532 that can include an adhesive. The interior face can be placed against a housing to permanently or removable adhere the grip guide to the housing, as shown in FIGS. 5F and 5G. The grip guide 530 can be provided in pairs or groups of four to fully define gripping sections.

Referring now to FIGS. 5F and 5G, various example grip guides 510, 520, 530 are shown adhered to a housing 500 which can receive, or be part of a hand held wireless communication device. The grip guides can be applied adjacent to antenna regions 570, 575 to guide a user to grip away from the antenna regions. Gripping regions 560, 565 can be defined between the grip guides. Grip guides can be supplied in groups of two or four and placed to define grip regions between the grip guides. For example, a first grip guide 510 can be applied at the bottom 580 of the housing 500 and a second grip guide (not shown) similar or identical to grip guide 510 can be applied at a top of the housing. Alternatively or additionally, four grip guides 520 or 530 can be supplied and applied at top and bottom locations on each side of the housing. For simplicity, one example grip guide 510, 520, 530 is shown in FIGS. 5F and 5G, but one skilled in the art understands how to use them in combination to define gripping regions.

EXAMPLES

Example 1 can include or use subject matter (such as an apparatus, a method, a means for performing acts, or a device readable medium including instructions that, when performed by the device, can cause the device to perform acts), such a hand held wireless communication device housing that guides proper hand placement on the housing. The housing can include a frame including a top wall, a bottom wall, a first side wall and a second side wall, the first side wall and second side wall extending between the top wall and the bottom wall, each of the top wall, bottom wall, first side wall, and second side wall having an interior surface and an exterior surface. The interior surface of the top wall, bottom wall, first side wall and second side wall can define an interior region sized and shaped to receive a hand held wireless communication device. The exterior surface of the first side wall can include a first grip guide can include a first lower protrusion at a bottom portion of the first side wall, a first upper protrusion at an upper portion of the first side wall, and a first gripping region between the first upper protrusion and the first lower protrusion. The exterior surface of the second side wall can include a second grip guide can include a second lower protrusion at a bottom portion of the second side wall, a second upper protrusion at an upper portion of the second side wall, and a second gripping region between the second upper protrusion and the second lower protrusion. The first lower protrusion, first upper protrusion, second lower protrusion, and second upper protrusion can be formed of a low dielectric constant and low loss tangent material.

Example 2 can include, or optionally be combined with the subject matter of Example 1, to optionally include, a housing sized and shaped such that, when a hand held wireless communication device is received into the frame and the hand held wireless communication device housing is held in a hand of a user at the first gripping region and the second gripping region, an antenna at a bottom portion of the hand held wireless communication device or the top portion of the hand held wireless communication device radiates primarily into free space, whereby radiation absorption by the hand of the user is minimized.

Example 3 can include, or optionally be combined with the subject matter of one or any combination of Examples 1 or 2 to optionally include, the first lower protrusion, first upper protrusion, second lower protrusion, and second upper protrusion define antenna transmission regions.

Example 4 can include, or can optionally be combined with the subject matter of one or any combination of Examples 1 through 3 to optionally include a protrusion that has a thickness of at least 10 mm.

Example 5 can include, or can optionally be combined with the subject matter of one or any combination of Examples 1 through 4 to optionally include, a frame that includes a removable case for a cellular telephone.

Example 6 can include, or can optionally be combined with the subject matter of one or any combination of Examples 1 through 4 to optionally include frame that is integral with a cell phone includes a touchscreen, a processor, a cellular radio, a microphone, and an antenna disposed in the antenna region.

Example 7 can include, or can optionally be combined with the subject matter of one or any combination of Examples 1 through 6 to optionally include, a housing that is formed of a material that retains its shape when gripped in the hand.

Example 8 can include, or can optionally be combined with the subject matter of one or any combination of Examples 1 through 6 to include, subject matter (such as an apparatus, a method, a means for performing acts, or a machine readable medium including instructions that, when performed by the machine,) that includes an electronic communication device that can include a touchscreen, a memory, a processor operatively coupled to the touchscreen the memory, at least one wireless communication circuit operatively coupled to the processor, at least one antenna operatively coupled to the at least one wireless communication circuit, and a housing. The touchscreen, processor, wireless communication circuit and antenna can be assembled into the housing. The housing can include two or more protrusions disposed adjacent to first and second ends of the at least one antenna, the two or more protrusions formed of low dielectric constant and low loss tangent material, wherein the two or more protrusions define an antenna radiation zones at ends of the at least one antenna the antenna.

Example 9 can include, or can optionally be combined with the subject matter of one or any combination of Examples 1 through 8 to optionally include an electronic communication device that includes a first antenna and a second antenna, and the two or more protrusions include a first and second protrusions adjacent to ends of the first antenna and second and third protrusions adjacent to ends of the second antenna.

Example 10 can include, or can optionally be combined with the subject matter of one or any combination of Examples 1 through 8 to optionally include an electronic communication device that includes a cellular phone or a tablet computer.

Example 11 can include, or can optionally be combined with the subject matter of one or any combination of Examples 1-10, to optionally include an electronic communication device that include includes an antenna array, and at least a wireless communication circuit that executes signal processing algorithms to identify spatial signal signatures and control the antenna array to direct an electromagnetic beam on a target.

Example 12 can include, or can optionally be combined with the subject matter of one or any combination of Examples 1 through 11 to include, subject matter (such as an apparatus, a method, a means for performing acts, or a machine readable medium including instructions that, when performed by the machine) that includes a grip guide that can be attached to a wireless communication device housing. The grip guide can include one or more protrusions sized and shaped to connect to a housing for a handheld communications device. The housing can include a top, a bottom, and first and second sides extending between the top and bottom. The grip guide can include a plurality of protrusions sized and shaped to cover portions of first and second sides of the communication device and extend laterally beyond opposite first and second sides of a communication device. The protrusions can have a height and width sufficient to guide a user to grip the housing at a location not covered by the protrusions. The protrusions can be sized and shaped to cover a region horizontal to an antenna region of a handheld wireless communications device.

Example 13 can include, or can optionally be combined with the subject matter of one or any combination of Examples 1-12, to optionally include a grip guide that is removably connectable to the frame of the wireless communication device housing. The grip guide can, for example, be mechanically secured, such as snap-fit or connected with a bracket.

Example 14 can include, or can optionally be combined with the subject matter of one or any combination of Examples 1-13, to optionally include a grip guide includes that includes an adhesive. For example, the grip guide can be connected to the housing with a permanent adhesive, or a removable adhesive.

Example 15 can include, or can optionally be combined with the subject matter of one or any combination of Examples 1-14, to optionally include a grip guide that includes a pressure-sensitive removable adhesive.

Example 16 can include, or can optionally be combined with the subject matter of one or any combination of Examples 1-15, to optionally include a grip guide that includes a first protrusion, a second protrusion, and a back portion extending between the first protrusion and the second protrusion.

Example 17 can include, or can optionally be combined with the subject matter of one or any combination of Examples 1-16, to optionally include a grip guide having a back portion that includes a front surface and a back surface, a portion of the front surface including a pressure-sensitive removable adhesive.

Example 18 can include, or can optionally be combined with the subject matter of one or any combination of Examples 1-17, to optionally include a first protrusion that includes a first inner face and a second protrusion that includes a second inner face, the first inner face and second inner face defining a gap sized and shaped to receive a housing for a handheld wireless communication device.

Example 19 can include, or can optionally be combined with the subject matter of one or any combination of Examples 1-18, to optionally include a grip guide that includes a first protrusion having a first attachment surface including an adhesive, and a second protrusion having a second attachment surface including an adhesive, the first attachment surface and second attachment surface being attachable to a wireless communication device housing.

Example 20 can include, or can optionally be combined with the subject matter of one or any combination of Examples 1-19, to optionally include a grip guide including a housing having a top and a bottom. The top and bottom of the housing can define a vertical axis extending from the top to the bottom, and the first and second side define a horizontal axis extending between the first and second sides. An antenna region can be at the bottom of the housing. The housing can include protrusions that are sized and shaped to force a user to grip the wireless communication device housing at a gripping region that is vertically displaced from the antenna region when the grip guide is attached at the bottom of the housing. For example, the gripping region can be a region that does not overlap with the antenna region in the horizontal direction.

Example 21 can include, or can optionally be combined with the subject matter of one or any combination of Examples 1 through 20 to include, subject matter (such as an apparatus, a method, a means for performing acts, or a machine readable medium including instructions that, when performed by the machine) that includes a communication device housing including a frame including one or more exterior surfaces and one or more interior surfaces, the one or more interior surfaces defining an interior region sized and shaped to receive at least a portion of a communication device including one or more antennas disposed in one or more antenna regions. The one or more exterior surfaces of the frame can include one or more protrusions disposed adjacent to at least one of the one or more antenna regions.

Example 22 can include, or can optionally be combined with the subject matter of any one or any combination of Examples 1 through 21 to optionally include frame that includes a top wall, a bottom wall, and a first side wall and a second side wall, the first side wall and second side wall extending between the top wall and the bottom wall, the one or more exterior surfaces include a top exterior surfaces of the top wall, a bottom exterior surface of the bottom wall, a first side exterior surface of the first side wall, and a second side exterior surface of the second side wall. One or more protrusions can extend from the exterior surface. The one or more protrusions can include a first protrusion at a bottom portion of the first side wall and a second protrusion at a bottom portion of the second side wall.

Example 23 can include, or optionally be combined with the subject matter of any one or any combination of Examples 1 through 22 to include, a communication device housing that can include a first gripping region is defined above the first protrusion on the first side wall exterior surface, and a second gripping region is defined above the second protrusion on the second side wall exterior surface, the first gripping region and second region are separated from the antenna region of the communication device by the first and second protrusions.

Example 24 can include, or optionally be combined with the subject matter of any one or any combination of Examples 1 to 23 to include, a communication device housing that has one or more protrusions, including a third protrusion at a top portion of the first side wall and a fourth protrusion at a top portion of the second side wall.

Example 25 can include, or can option be combined with the subject matter of any one or any combination of Examples 1 to 24 to include, a communication device housing with a first gripping region that is defined on the first side wall exterior surface between the first protrusion and third protrusion, and a second gripping region that is defined on the second side wall exterior surface between the second protrusion and fourth protrusion. The first gripping region and second region can be separated from the antenna region by the first and second protrusions.

Example 26 can include, or can optionally be combined with the subject matter of any one or any combination of Examples 1 to 25 to include a wireless communication device housing that includes a removable case for a cellular telephone.

Example 27 can include, or can optionally be combined with subject matter of any one or any combination of Examples 1 to 26 to include a communication device housing having a frame that is integral with a cell phone includes a touchscreen, a processor, a cellular radio, a microphone, and an antenna disposed in the antenna region.

Example 28 can include, or can optionally be combined with subject matter of any one or any combination of Examples 1 to 27 to include protrusions that are removably attached to the frame.

Each of these non-limiting examples can stand on its own, or can be combined in various permutations or combinations with one or more of the other examples.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. §1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

The claimed invention is:

1. A hand held wireless communication device housing that guides proper hand placement on the housing, the housing comprising: a frame including a top wall, a bottom wall, a first side wall and a second side wall, the first side wall and second side wall extending between the top wall and the bottom wall, each of the top wall, bottom wall, first side wall, and second side wall having an interior surface and an exterior surface, the interior surface of the top wall, bottom wall, first side wall and second side wall defining an interior region sized and shaped to receive a hand held wireless communication device, the exterior surface of the first side wall including a first grip guide including: a first lower protrusion at a bottom portion of the first side wall, a first upper protrusion at an upper portion of the first side wall, and a first gripping region between the first upper protrusion and the first lower protrusion; the exterior surface of the second side wall including a second grip guide including: a second lower protrusion at a bottom portion of the second side wall a second upper protrusion at an upper portion of the second side wall, and a second gripping region between the second upper protrusion and the second lower protrusion, the first lower protrusion, first upper protrusion, second lower protrusion, and second upper protrusion formed of a low dielectric constant and low loss tangent material; wherein when a hand held wireless communication device is received into the frame and the hand held wireless communication device housing is held in a hand of a user at the first gripping region and the second gripping region, an antenna at a bottom portion of the hand held wireless communication device or the top portion of the hand held wireless communication device radiates primarily into free space, whereby radiation absorption by the hand of the user is minimized, and wherein the first lower protrusion, first upper protrusion, second lower protrusion, and second upper protrusion define antenna transmission regions.

2. The hand held wireless communication device housing of claim 1, wherein the protrusion has a thickness of at least 10 mm.

3. The hand held wireless communication device housing of claim 1, wherein the frame includes a removable case for a cellular telephone.

4. The hand held wireless communication device housing of claim 1, wherein the frame is integral with a cell phone includes a touchscreen, a processor, a cellular radio, a microphone, and an antenna disposed in the antenna region.

5. The hand held wireless communication device housing of claim 1, wherein the housing is formed of a material that retains its shape when gripped in the hand.

* * * * *